(12) United States Patent
Ozonat et al.

(10) Patent No.: US 9,264,505 B2
(45) Date of Patent: Feb. 16, 2016

(54) BUILDING A SEMANTICS GRAPH FOR AN ENTERPRISE COMMUNICATION NETWORK

(71) Applicant: Hewlett-Packard Development Company, L.P., Houston, TX (US)

(72) Inventors: Mehmet Kivanc Ozonat, San Jose, CA (US); Claudio Bartolini, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 325 days.

(21) Appl. No.: 13/755,633

(22) Filed: Jan. 31, 2013

(65) Prior Publication Data

US 2014/0214942 A1    Jul. 31, 2014

(51) Int. Cl.
H04L 29/08    (2006.01)
G06Q 10/00    (2012.01)
G06Q 10/06    (2012.01)

(52) U.S. Cl.
CPC ............... *H04L 67/24* (2013.01); *G06Q 10/00* (2013.01); *G06Q 10/063* (2013.01)

(58) Field of Classification Search
CPC ...... G06F 17/28; G06F 17/3053; H04L 29/08
USPC ....................................................... 709/204
See application file for complete search history.

(56) References Cited

U.S. PATENT DOCUMENTS

| | | | | |
|---|---|---|---|---|
| 7,289,982 | B2 * | 10/2007 | Saito et al. | |
| 7,917,492 | B2 * | 3/2011 | Bargeron et al. | 707/708 |
| 8,204,891 | B2 * | 6/2012 | Thompson et al. | 707/749 |
| 8,325,189 | B2 * | 12/2012 | Matsumura | 345/440 |
| 8,332,434 | B2 | 12/2012 | Salkeld et al. | |
| 8,538,916 | B1 * | 9/2013 | Alfonseca et al. | 707/603 |
| 2005/0276479 | A1 * | 12/2005 | Goldberg et al. | 382/181 |
| 2006/0259481 | A1 | 11/2006 | Handley | |
| 2007/0143278 | A1 | 6/2007 | Srivastava et al. | |
| 2007/0168852 | A1 * | 7/2007 | Erol et al. | 715/500.1 |
| 2009/0012842 | A1 * | 1/2009 | Srinivasan et al. | 705/10 |
| 2009/0164895 | A1 * | 6/2009 | Baeza-Yates et al. | 715/700 |
| 2009/0234832 | A1 | 9/2009 | Gao et al. | |
| 2010/0094992 | A1 * | 4/2010 | Cherkasova et al. | 709/224 |
| 2011/0295589 | A1 * | 12/2011 | Brockett et al. | 704/4 |
| 2013/0138696 | A1 * | 5/2013 | Turdakov et al. | 707/794 |
| 2013/0159346 | A1 * | 6/2013 | Kasravi et al. | 707/771 |

OTHER PUBLICATIONS (Y. Matsuo et al.), (Keyword Extraction from a Single Document using Word Co-occurrence Statistical Information), (Dec. 10, 2003), (International Journal on Artificial Intelligence Tools World Scientific Publishing Company).*

(Continued)

*Primary Examiner* — Ebrahim Golabbakhsh
(74) *Attorney, Agent, or Firm* — Brooks, Cameron & Huebsch, PLLC

(57) ABSTRACT

Building a semantics graph for an enterprise communication network can include extracting a first signifier and a second signifier from the enterprise communication network, determining a semantic proximity of the first signifier and the second signifier using an engine executing computer readable instructions, and building the semantics graph, wherein the first signifier and the second signifier are represented as nodes connected by an edge representing the semantic proximity of the first signifier and the second signifier.

13 Claims, 4 Drawing Sheets

(56) References Cited

OTHER PUBLICATIONS

Carpineto, et al., "A Survey of Web Clustering Engines," ACM Computing Surveys, vol. 41, No. 3, Article 17, Jul. 2009, 38 pages.

Velikovich, et al., "The viability of web-derived polarity lexicons," Retrieved from http://dejanseo.com.au/research/google/36267.pdf, Jun. 2010, 9 pages.

* cited by examiner

BUILDING A SEMANTICS GRAPH FOR AN ENTERPRISE COMMUNICATION NETWORK

BACKGROUND

Users, such as employees of an enterprise, can share information within the enterprise (e.g., a company and/or organization) using a network connecting the users. Users can share information within the enterprise using knowledge management tools. A knowledge management tool can include an internal enterprise domain, an internal enterprise file share system, and/or an internal enterprise communication system.

DETAILED DESCRIPTION

Figure 1:
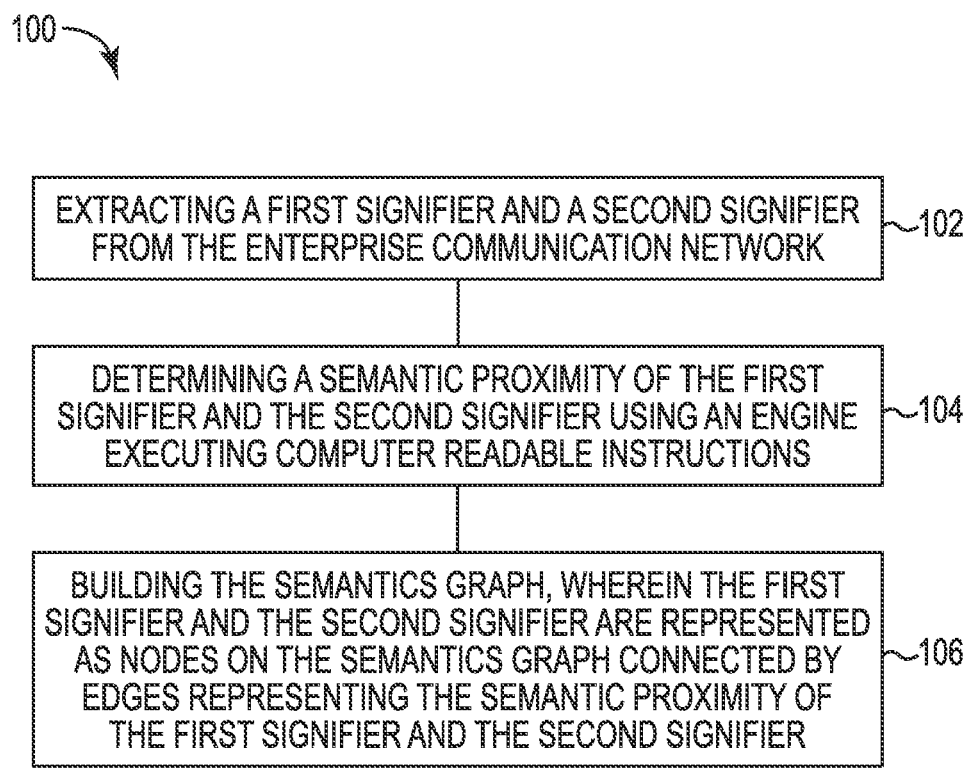
FIG. 1 is a flow chart illustrating an example of a method for building a semantics graph for an enterprise communication network according to the present disclosure.

An enterprise may use an enterprise communication network, such as a cloud system, to share knowledge among users of the enterprise (e.g., employees and/or customers). Enterprise knowledge management, as used herein, includes managing knowledge resources in order to facilitate access and reuse of knowledge, for example, by using information technology. Enterprise knowledge management makes knowledge accessible and reusable to users of the enterprise.

Enterprise employees may spend a substantial amount of time searching for and retrieving relevant information. While Internet search engines have grown increasingly sophisticated and efficient, they have little application in the enterprise context, due in part to the nature of the information associated with an enterprise. The terms and phrases (e.g., information associated with an enterprise) used in the enterprise context are often different from those used in the general English language. For instance, an Internet search for the phrase "workplace services" returns concepts such as "janitorial services" as a related service, which is reasonable since, within the context of the general English language, janitorial services is a workplace service. Yet, within the enterprise context, the workplace services can be related to services such as service desk, collaboration services, and/or mobile workplace services, among other services.

In contrast, in accordance with the present disclosure, a semantics graph can be built for a specific enterprise communication network. Building a semantics graph for an enterprise communication network can allow the development of a useful and robust enterprise knowledge management tool. A semantics graph for the enterprise communication network can be built with nodes representing signifiers (e.g. phrases and/or words) and weighted edges representing the similarity between the signifiers to enable more accurate contextual searches and knowledge sharing within the enterprise.

Examples of the present disclosure may include methods, systems, and computer-readable and executable instructions and/or logic. An example method for building a semantics graph for an enterprise communication network can include extracting a first signifier and a second signifier from the enterprise communication network, determining a semantic proximity of the first signifier and the second signifier using an engine executing computer-readable instructions, and building the semantics graph, wherein the first signifier and the second signifier are represented as nodes connected by an edge representing the semantic proximity of the first signifier and the second signifier.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designator "N", particularly with respect to reference numerals in the drawings, indicate that a number of the particular feature so designated can be included with a number of examples of the present disclosure. Also, as used herein, "a number of" an element and/or feature can refer to one or more of such elements and/or features.

FIG. 1 is a block diagram illustrating an example of a method 100 for building a semantics graph for an enterprise communication network according to the present disclosure. An enterprise communication network, as used herein, can include a network connecting a plurality of users and content through a range of activities. The enterprise communication network can include externally available Internet sites (e.g. external domains) and internally available Intranet sites (e.g. internal enterprise domains and/or SharePoint sites). The activities can be related to a services network of the enterprise. For example, the activities can include posting services-related entries, linking entries to internal enterprise domains and/or external domains, and/or reading, commenting, and/or voting on other user's entries.

At 102, the method 100 for building a semantics graph for an enterprise communication network can include extracting a first signifier and a second signifier from the enterprise communication network. A signifier, as used herein, can include a word, phrase, and/or acronym used in the enterprise communication network. In various examples, the signifiers can be extracted using search tools (e.g., web crawlers), and/or extractor tools (e.g., extractors). A search tool, as used herein, can include hardware components and/or computer-readable instruction components designated and/or designed to scan the enterprise communication network to collect data. The data can include documents and/or data associated with the enterprise communication network. Such data can include Hyper Text Markup Language (HTML) documents, email communications, and/or other documents (e.g., SharePoint documents). Once extracted from the data, the signifiers can be stored in a repository of signifiers for use in generating the semantics graph.

In some examples, the first signifier and the second signifier can be extracted from the enterprise communication network using a web crawler engine. As discussed further herein, the web crawler engine can execute computer-readable instructions to crawl the internal domains and SharePoint sites on the enterprise communication network in a methodical, automated manner, searching links within each site it searches and extracting signifiers.

At 104, the method 100 for building a semantics graph for an enterprise communication network can include determining a semantic proximity of the first signifier and the second signifier using an engine executing computer-readable instructions. Semantic proximity, as used herein, can include semantic relatedness and/or semantic similarity wherein a metric is assigned to a pair of signifiers indicating their relatedness. For instance, semantic proximity and/or semantic relatedness can indicate how frequently a pair of signifiers is used together. The semantic proximity can be determined using a number of engines executing computer-readable instructions. As discussed further herein, the number of engines can include a pattern recognizer engine, a web crawler engine, a stop-word eliminator engine, a word stemmer engine, and/or a co-occurrence based clustering engine, among others.

At 106, the method 100 for building a semantics graph for an enterprise communication network can include building the semantics graph, wherein the first signifier and the second signifier are represented as nodes on the semantics graph connected by edges representing the semantic proximity of the first signifier and the second signifier. A semantics graph, as used herein, can include a data structure representing concepts that are related to one another. The concepts can include words, phrases, and/or acronyms, for instance. A node can include a vertex representing a signifier. The edges can connect related signifiers. As discussed further herein, each edge can be weighted based on the semantic proximity between two related signifiers (e.g., the first signifier and the second signifier).

Figure 2:
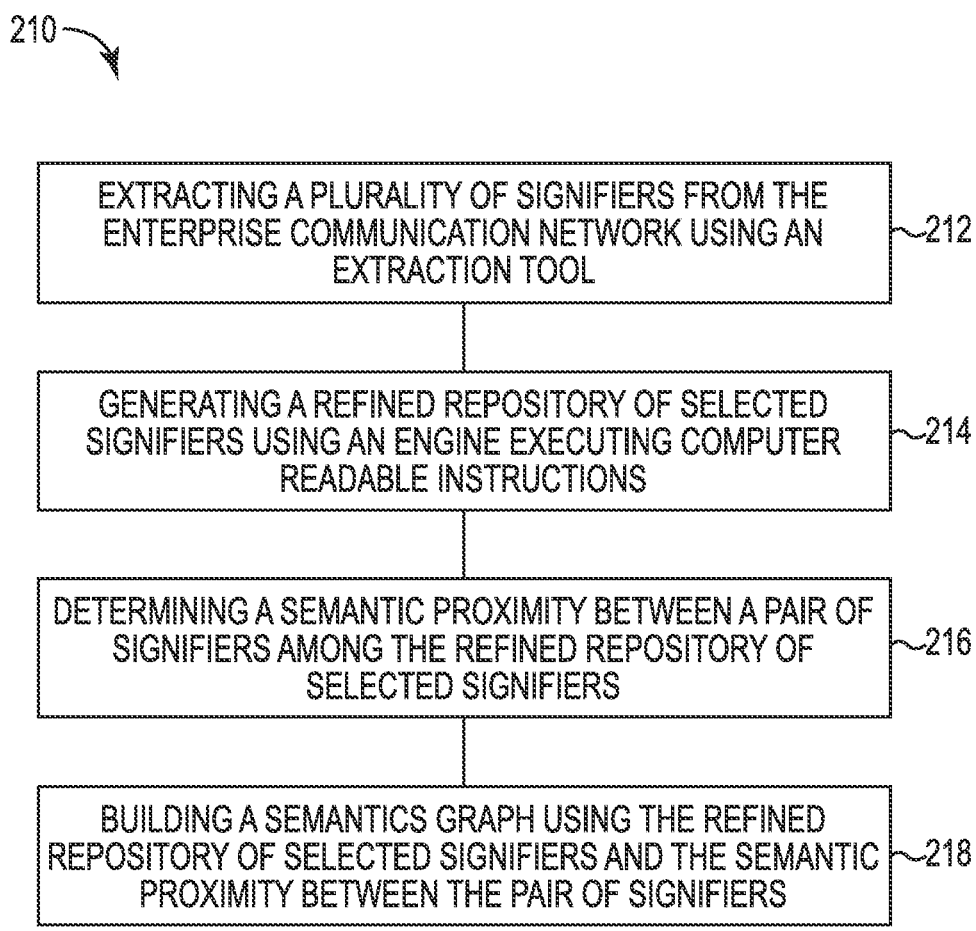
FIG. 2 is a flow chart illustrating an example of a method for building a semantics graph for an enterprise communication network according to the present disclosure.

FIG. 2 is a flow chart illustrating an example of a method 210 for building a semantics graph for an enterprise communication network according to the present disclosure. At 212, the method 210 can include extracting a plurality of signifiers from the enterprise communication network using an extraction tool. As mentioned herein, a plurality of signifiers can be extracted from data that is associated with the enterprise communication network. An extraction tool can include hardware components and/or computer-readable instructions that extract information from an unstructured and/or semi-structured structure (e.g., data on the enterprise communication network). Once extracted, the signifier can be stored in a repository of signifiers for use in generating the semantics graph. The repository of signifiers can include hardware components and/or computer-readable instructions.

At 214, the method 210 can include generating a refined repository of selected signifiers using an engine executing computer-readable instructions. A refined repository of selected signifiers can include a number of signifiers selected from the repository of signifiers (e.g., selected signifiers). In other words, the refined repository of selected signifiers can include a subset of signifiers from the repository of signifiers. Generating a refined repository of selected signifiers can include reducing the number of signifiers in the repository using a number of engines.

In a number of examples, a stop-word eliminator engine can be used to generate a refined repository of selected signifiers by removing stop-words from the repository. The stop-word eliminator engine can execute computer-readable instructions to scan signifiers in the repository and determine whether a signifier is a stop-word. A stop-word can include a number of words that are very frequently used in the English language and if used in a word search by an enterprise communication network user, can potentially return every document in the enterprise communication network. Some examples of a stop-word can include 'if', 'and', 'when', 'how', 'I', and/or 'we'. Once identified as a stop-word by the stop-word eliminator engine, the signifier can be excluded from the refined repository of selected signifiers.

In other examples, a term frequency-inverse document frequency (Tf-idf) engine can be used to generate a refined repository of selected signifiers by applying a Tf-idf method to the repository. The Tf-idf method can include a statistical determination of the relevance of a signifier in the repository. The Tf-idf method can include comparing the frequency of occurrence of a signifier in the repository to the frequency of occurrence of the signifier in the English language. If the frequency of occurrence of the signifier in the repository is higher than the frequency of occurrence of the signifier in the English language, then the signifier can be identified as a selected signifier and can be included in the refined repository of selected signifiers.

At 216, the method 210 can include determining a semantic proximity between a pair of signifiers among the refined repository of selected signifiers. In a number of examples, determining the semantic proximity between a pair of signifiers among the refined repository of selected signifiers (e.g. a first signifier and a second signifier from the refined repository of selected signifiers) is determined based on a set of criteria. Determining the semantic proximity between the first signifier and the second signifier can include determining if a threshold of semantic proximity is exceeded. The threshold of semantic proximity is exceeded if one of a plurality of criteria is satisfied. As discussed further herein, an edge connecting the first signifier and the second signifier can be weighted if the threshold of semantic proximity is exceeded. The criteria can include rules. An example of the plurality of rules can include:

a. if the pair of signifiers occurs within the same pattern (e.g. the same list and/or table), as determined by a pattern recognizer engine.
b. if the pair of signifiers occurs within the same pattern (e.g. the same list and/or table) more than once, as determined by the pattern recognizer engine.
c. if the pair of signifiers occurs within the same page (e.g. website), as determined by a web crawler engine.
d. if the pair of signifiers occurs within linked pages (e.g. websites), as determined by the web crawler engine.
e. if neither the first signifier nor the second signifier are stop-words, as determined by the stop-word eliminator engine.
f. if the first signifier and the second signifier share common root words, as determined by a word stemmer engine.
g. if the first signifier and the second signifier are clustered by a co-occurrence based clustering engine.

The pattern recognizer engine can execute computer-readable instructions to search the enterprise communication network and recognize HTML-based patterns within sites in the enterprise communication network. An HTML-based pattern can include lists and/or tables that include a number of signifiers. For instance, the pattern recognizer engine can search a SharePoint site in the enterprise communication network and recognize a HTML-based pattern (e.g. a list) containing the signifiers "wireless" and "connection". In another instance, the pattern recognizer engine can search an internal enterprise domain and recognize a table containing the signifiers "launch" and "product".

The web crawler engine can execute computer-readable instructions to crawl the internal domains and SharePoint sites that are associated with the enterprise communication network in a methodical, automated manner and extracting signifiers. The word stemmer engine can execute computer-readable instructions determine if two or more signifiers share the same root word. A root word can include the primary lexical unit of a word, which carries the most significant aspects of semantic content and cannot be reduced into smaller constituents. For example, book and books share the same root word "book". In another example, "digitization" and "digital" share the same root word "digit".

The co-occurrence based clustering engine can execute computer-readable instructions to calculate a co-occurrence metric (e.g. a statistical value of co-occurrence) between the first signifier and the second signifier and cluster the co-occurrence metrics using the co-occurrence metric.

In a number of examples, the co-occurrence based clustering engine can execute computer-readable instructions to generate an N×M co-occurrence matrix. The N×M co-occurrence matrix can denote the number of words in the refined repository of selected signifiers as N and can denote a preselected integer as M where M<N. In a number of examples, M can include the integer 500. The N×M co-occurrence matrix can include indexing the words by a first signifier n (e.g. $1 \leq n \leq N$). The N×M co-occurrence matrix can also include indexing the most frequently observed M words in the refined repository of selected signifiers by a second signifier m (e.g. $1 \leq m \leq M$).

The N×M co-occurrence matrix, as used herein, can include the frequency of co-occurrence of a first signifier n and a second signifier m. For instance, n can represent the first signifier "wireless" and m can represent the second signifier "connection". The (n,m) element (i.e., the $n^{th}$ row and the $m^{th}$ column) of the N×M co-occurrence matrix can identify that the signifiers "wireless" and "connection" occur together a particular number of times in the refined repository of selected signifiers.

In a number of examples, the co-occurrence based clustering engine can execute computer-readable instructions to calculate a co-occurrence metric ($x^2(n)$) for a first signifier and a second signifier. Calculating a co-occurrence metric for a first signifier and a second signifier can include:

$$x^2(n) = \sum_{1 \leq m \leq M} \left( \frac{|freq(n, m) - N_n p_m|}{N_n p_m} \right).$$

The co-occurrence metric can include the sum of the absolute value of the frequency of co-occurrence of the first signifier n and the second signifier m (freq(n,m)) determined by the N×M co-occurrence matrix, less the unconditional probability of co-occurrence of the first signifier n and the second signifier m ($N_n p_m$) divided by the unconditional probability of co-occurrence of the first signifier n and the second signifier m ($N_n p_m$), where n represents the first signifier and m represents the second signifier. The unconditional probability of a signifier m can be represented as the expected probability $p_m$ and the total number of co-occurrences of the signifier n and frequent signifiers as $c_n$.

In a number of examples, the frequency of co-occurrence of the signifier n and the signifier m can be similar to the unconditional probability of the signifier n and the signifier m, indicating that the two signifiers are not closely related (e.g. a low semantic proximity between the two signifiers). In other examples, the frequency of co-occurrence of the signifier n and the signifier m can be greater than the unconditional probability of the signifier n and the signifier m, indicating the two signifiers are closely related (e.g., a high semantic proximity between the two signifiers).

The co-occurrence based clustering engine can execute computer-readable instructions to cluster the first signifier and the second signifier, using the co-occurrence metric, according to a set of predefined rules. In a number of examples, the first signifier and the second signifier can be clustered if the co-occurrence metric between the first signifier and the second signifier exceeds a threshold value.

In other examples, the first signifier and the second signifier can be clustered if the co-occurrence metric between the first signifier and the second signifier have a similar distribution of co-occurrence with other signifiers. To determine if the first signifier and the second signifier have a similar distribution of co-occurrence with other signifiers, statistical distribution methods can be used. For instance, Kullback-Leibler divergence can be used. As described herein, the threshold of semantic proximity can be exceeded if the first signifier and the second signifier are clustered by the co-occurrence based clustering engine.

At 218, the method 210 can include building a semantics graph using the refined repository of selected signifiers and the semantic proximity between the pair of signifiers. In various examples of the present disclosure, the semantics graph can include weighted edges representing the semantic proximity between a plurality of pairs of signifiers from the refined repository of selected signifiers.

Figure 3:
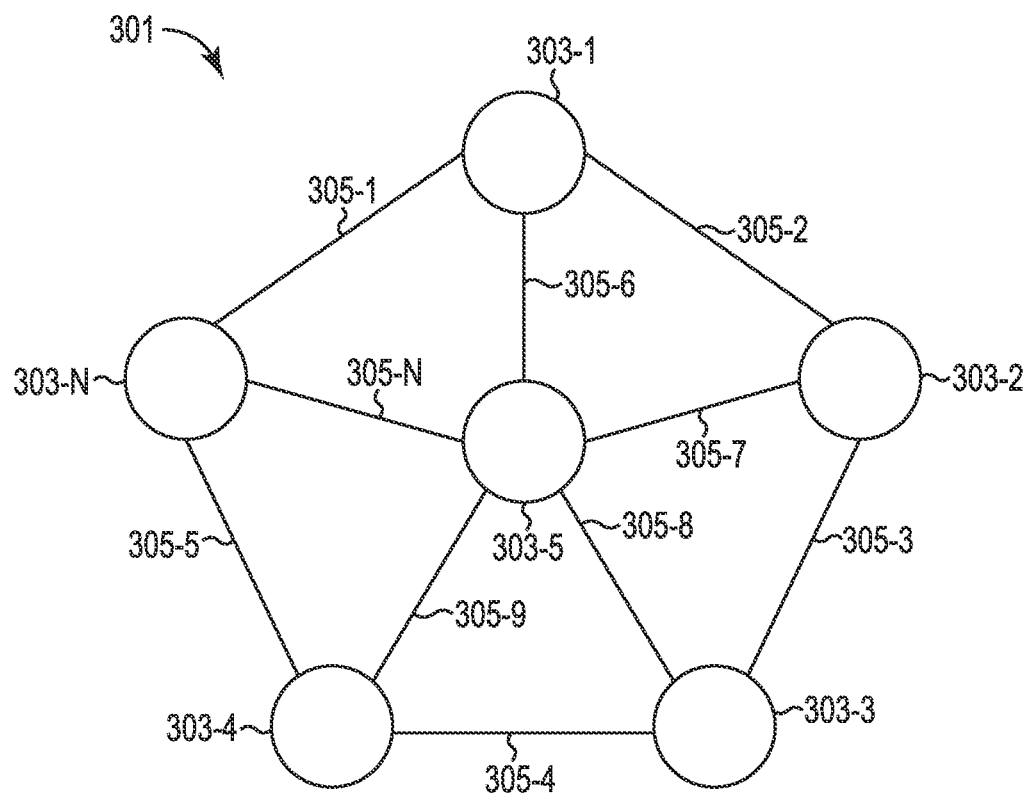
FIG. 3 illustrates an example semantics graph according to the present disclosure.

FIG. 3 illustrates an example semantics graph 301 according to the present disclosure. The semantics graph 301 can include a number of signifiers from the refined repository of selected signifiers 303-1, 303-2, . . . , 303-N represented as nodes. The number of signifiers 303-1, 303-2, . . . , 303-N can be connected by edges 305-1, 305-2, . . . , 305-N representing the semantic proximity between the number of signifiers. For instance, a first signifier 303-1 can be connected to a second signifier 303-2 with an edge 305-2 representing the semantic proximity between the first signifier and the second signifier.

In a number of examples, each edge connecting a pair of nodes in the semantics graph can be weighted to represent the semantic proximity between the pair of signifiers. For instance, the edge 305-2 can have a numerical value (e.g. the co-occurrence metric, for example) attached to it representing the semantic proximity between the signifier 303-1 and the signifier 303-2. In another example, the edge 305-2 can include an identifier (e.g. a different pattern of line that represents the edge, a different weight of a line that represents the edge, and/or a different color of a line that represents the edge) indicating that the semantic proximity between the first signifier 303-1 and the second signifier 303-2 exceeds the threshold of semantic proximity.

Figure 4:
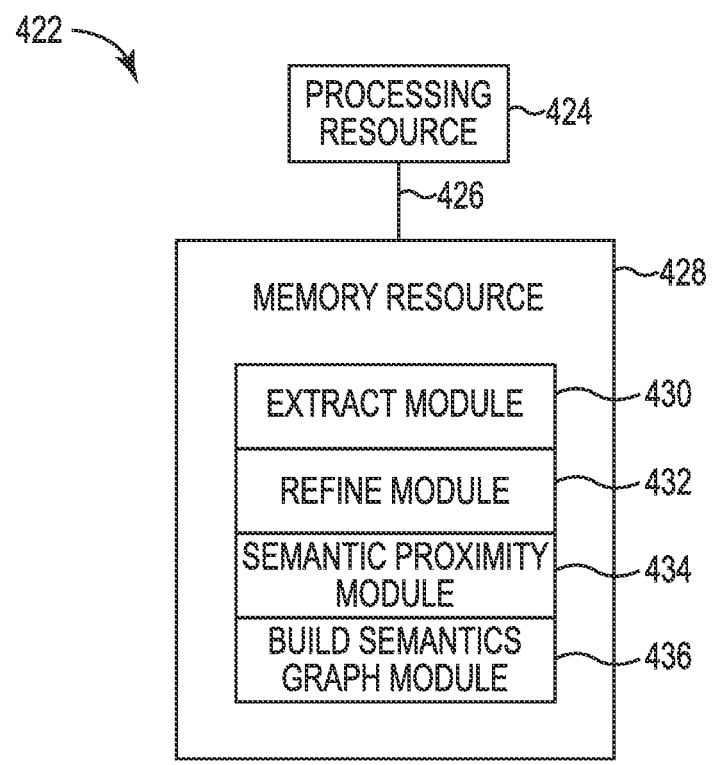
FIG. 4 is a diagram illustrating an example of a system according to the present disclosure.

FIG. 4 is a diagram illustrating an example of a system 422 according to the present disclosure. The system 422 can utilize software, hardware, firmware, and/or logic to perform a number of functions.

The system 422 can be any combination of hardware and program instructions configured to build a semantics graph for an enterprise communication network. The hardware, for example can include a processing resource 424, and/or a memory resource 428 (e.g., computer-readable medium (CRM), machine readable medium (MRM), database, etc.) A processing resource 424, as used herein, can include any number of processors capable of executing instructions stored by a memory resource 428. Processing resource 424 may be integrated in a single device or distributed across devices. The program instructions (e.g., computer-readable instructions (CRI)) can include instructions stored on the memory resource 428 and executable by the processing resource 424 to implement a desired function (e.g., build a semantics graph using a co-occurrence metric, etc.).

The memory resource 428 can be in communication with a processing resource 424. A memory resource 428, as used herein, can include any number of memory components capable of storing instructions that can be executed by processing resource 424. Such memory resource 428 can be a non-transitory CRM. Memory resource 428 may be integrated in a single device or distributed across devices. Further, memory resource 428 may be fully or partially integrated in the same device as processing resource 424 or it may be separate but accessible to that device and processing resource 424. Thus, it is noted that the system 422 may be implemented on a user and/or a client device, on a server device and/or a collection of server devices, and/or on a combination of the user device and the server device and/or devices.

The processing resource 424 can be in communication with a memory resource 428 storing a set of CRI executable by the processing resource 424, as described herein. The CRI can also be stored in remote memory managed by a server and represent an installation package that can be downloaded, installed, and executed. The system 422 can include memory resource 428, and the processing resource 424 can be coupled to the memory resource 428.

Processing resource 424 can execute CRI that can be stored on an internal or external memory resource 428. The processing resource 424 can execute CRI to perform various functions, including the functions described with respect to FIGS. 1-3. For example, the processing resource 424 can execute CRI to build a semantics graph for an enterprise communication network.

The CRI can include a number of modules 430, 432, 434, 436. The number of modules 430, 432, 434, 436 can include CRI that when executed by the processing resource 424 can perform a number of functions.

The number of modules 430, 432, 434, 436 can be sub-modules of other modules. For example, the extract module 430 and the refine module 432 can be sub-modules and/or contained within the same computing device. In another example, the number of modules 430, 432, 434, 436 can comprise individual modules at separate and distinct locations (e.g., CRM, etc.).

An extract module 430 can include CRI that when executed by the processing resource 424 can provide a number of extraction functions. The extract module 430 can extract a plurality of signifiers from an enterprise communication network using an extraction tool.

In a number of examples of the present disclosure, the system 422 can include a search module (not illustrated in FIG. 4). The search module can include CRI that when executed by the processing resource 424 can provide a number of search functions. The search module can search the enterprise communication network and/or the enterprise communication network for content (e.g., documents, signifiers, and/or other relevant data). The content searched for by the search module can be used by the extract module 430 to extract the plurality of signifiers, for instance.

A refine module 432 can include CRI that when executed by the processing resource 424 can perform a number of refining functions. The refine module 432 can generate a refined repository of selected signifiers using a number of engines.

The refine module 432 can include instructions to generate a refined repository of selected signifiers using a stop-word eliminator engine. The stop-word eliminator engine can identify stop-words and remove them from the repository. The refine module 432 can include instructions to generate a refined repository of selected signifiers using a Tf-idf engine. The Tf-idf engine can calculate a statistical relevance of a signifier in the repository and remove irrelevant signifiers (e.g., signifiers with a frequency of occurrence in the repository equal to the frequency of occurrence in the English language) from the repository.

A semantic proximity module 434 can include CRI that when executed by the processing resource 424 can perform a number of calculation functions. The semantic proximity module 434 can determine a semantic proximity between a pair of signifiers among a refined repository of selected signifiers; calculate a co-occurrence metric for the pair of signifiers using the co-occurrence matrix; and cluster the pair of signifiers using the co-occurrence metric.

A build semantics graph module 436 can include CRI that when executed by the processing resource 324 can perform a building graph functions. The build semantics graph module 334 can build the semantics graph for an enterprise communication network using the refined repository of selected signifiers and the semantic proximity between the pair of signifiers.

A memory resource 428, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 428 can be integral, or communicatively coupled, to a computing device, in a wired and/or a wireless manner. For example, the memory resource 428 can be an internal memory, a portable memory, a portable disk, or a memory associated with another computing resource (e.g., enabling CRIs to be transferred and/or executed across a network such as the Internet).

The memory resource 428 can be in communication with the processing resource 424 via a communication path 426. The communication path 426 can be local or remote to a machine (e.g., a computing device) associated with the processing resource 424. Examples of a local communication path 426 can include an electronic bus internal to a machine (e.g., a computing device) where the memory resource 428 is one of volatile, non-volatile, fixed, and/or removable storage medium in communication with the processing resource 424 via the electronic bus.

The communication path 426 can be such that the memory resource 428 is remote from the processing resource (e.g., 424), such as in a network connection between the memory resource 428 and the processing resource (e.g., 424). That is, the communication path 426 can be a network connection. Examples of such a network connection can include a local area network (LAN), wide area network (WAN), personal area network (PAN), and the Internet, among others. In such examples, the memory resource 428 can be associated with a first computing device and the processing resource 424 can be associated with a second computing device (e.g., a Java® server).

For example, a processing resource 424 can be in communication with a memory resource 428, wherein the memory resource 428 includes a set of instructions and wherein the processing resource 424 is designed to carry out the set of instructions. The processing resource 424 coupled to the memory resource 428 can execute CRI to extract a first signifier and a second signifier from an enterprise communication network using an extraction tool. The processing resource 424 coupled to the memory resource 328 can also execute CRI to calculate a co-occurrence metric between the first signifier and the second signifier, wherein calculating a co-occurrence metric between the first signifier and the second signifier includes instructions to: calculate a frequency of co-occurrence of the first signifier and the second signifier in the enterprise communication network; calculate an unconditional probability of co-occurrence of the first signifier and the second signifier; calculate an absolute value of a difference between the frequency of co-occurrence and the unconditional probability; and define the co-occurrence metric as a sum of a ratio of the absolute value and the unconditional probability. The processing resource 424 coupled to the memory resource 428 can also execute CRI to build the semantics graph using the first signifier, the second signifier, and the co-occurrence metric.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for building a semantics graph for an enterprise communication network, comprising:
    generating a refined repository of signifiers using a term frequency-inverse document frequency (Tf-idf) engine by:
        calculating a frequency of occurrence of each of a plurality of signifiers; and
        removing signifiers from the plurality of signifiers having a frequency of occurrence equal to a frequency of occurrence in the English language;
    extracting a first signifier among the refined repository and a second signifier among the refined repository from the enterprise communication network;
    determining a semantic proximity of the first signifier and the second signifier using an engine executing computer readable instructions; and
    building the semantics graph, wherein the first signifier and the second signifier are represented as nodes connected by an edge representing the semantic proximity of the first signifier and the second signifier.

2. The method of claim 1, wherein the edge is weighted to represent the semantic proximity between the first signifier and the second signifier.

3. The method of claim 1, wherein the semantic proximity includes a semantic relatedness between the first signifier and the second signifier.

4. The method of claim 1, wherein the engine is at least one of a stop-word eliminator engine, a word stemmer engine, a web crawler engine, a pattern recognizer engine, and a co-occurrence based clustering engine.

5. A non-transitory computer-readable medium storing a set of instructions executable by a processing resource, wherein the set of instructions can be executed by the processing resource to:
    generate a refined repository of selected signifiers using a term frequency-inverse document frequency (Tf-idf) engine by:
        calculating a frequency of occurrence of each of a plurality of signifiers; and
        removing signifiers from the plurality of signifiers having a frequency of occurrence equal to a frequency of occurrence in the English language;
    extract a first signifier among the refined repository and a second signifier among the refined repository from an enterprise communication network using an extraction tool;
    calculate a co-occurrence metric between the first signifier and the second signifier, wherein calculating the co-occurrence metric between the first signifier and the second signifier includes instructions to:
        calculate a frequency of co-occurrence of the first signifier and the second signifier in the enterprise communication network;
        calculate an unconditional probability of co-occurrence of the first signifier and the second signifier;
        calculate an absolute value of a difference between the frequency of co-occurrence and the unconditional probability; and
        define the co-occurrence metric as a sum of a ratio of the absolute value and the unconditional probability; and
    build the semantic graph using the first signifier, the second signifier, and the co-occurrence metric.

6. The non-transitory computer-readable medium of claim 5, wherein the set of instructions executable by the processing resource includes instructions to display the first signifier and the second signifier as nodes connected by an edge.

7. The non-transitory computer-readable medium of claim 6, wherein the set of instructions executable by the processing resource includes instructions to display the co-occurrence metric on the semantic graph as a numerical value associated with the edge.

8. A system for building a semantics graph for an enterprise communication network comprising:
    a processing resource;
    a memory resource coupled to the processing resource containing instructions executable by the processing resource to:
        extract a plurality of signifiers from the enterprise communication network using an extraction tool;
        generate a refined repository of selected signifiers using a term frequency-inverse document frequency (Tf-idf) engine executing computer readable instructions to:
            calculate a frequency of occurrence of each of the plurality of signifiers; and
            remove signifiers from the plurality of signifiers having a frequency of occurrence equal to a frequency of occurrence in the English language;
        wherein the plurality of signifiers are included in the refined repository;
        determine a semantic proximity between a pair of signifiers among the refined repository of selected signifiers, wherein determining the semantic proximity between the pair of signifiers among the refined repository of selected signifiers includes instructions to:
    generate a co-occurrence matrix containing the plurality of signifiers;
    calculate a co-occurrence metric for the pair of signifiers; and
    cluster the pair of signifiers using the co-occurrence metric; and
build the semantic graph using the refined repository of selected signifiers and the semantic proximity between the pair of signifiers.

9. The system of claim 8, wherein a stop-word eliminator engine is used to generate the refined repository of selected signifiers, wherein the stop-word eliminator engine removes stop-words from the repository of signifiers.

10. The system of claim 8, wherein the instructions executable to determine the semantic proximity between the pair of signifiers includes instructions to determine if a threshold of semantic proximity is exceeded.

11. The system of claim 10, wherein the threshold of semantic proximity is exceeded if the pair of signifiers among the refined repository of selected signifiers are clustered by a co-occurrence based clustering engine.

12. The system of claim 10, wherein the instructions to cluster the pair of signifiers using the co-occurrence metric includes instructions to cluster the pair of signifiers using a Kullback-Leibler divergence.

13. The system of claim 10, including instructions executable to display an identifier on the semantics graph indicating that the semantic proximity between the pair of signifiers exceeds the threshold of semantic proximity.

* * * * *